United States Patent Office 3,552,899
Patented Jan. 5, 1971

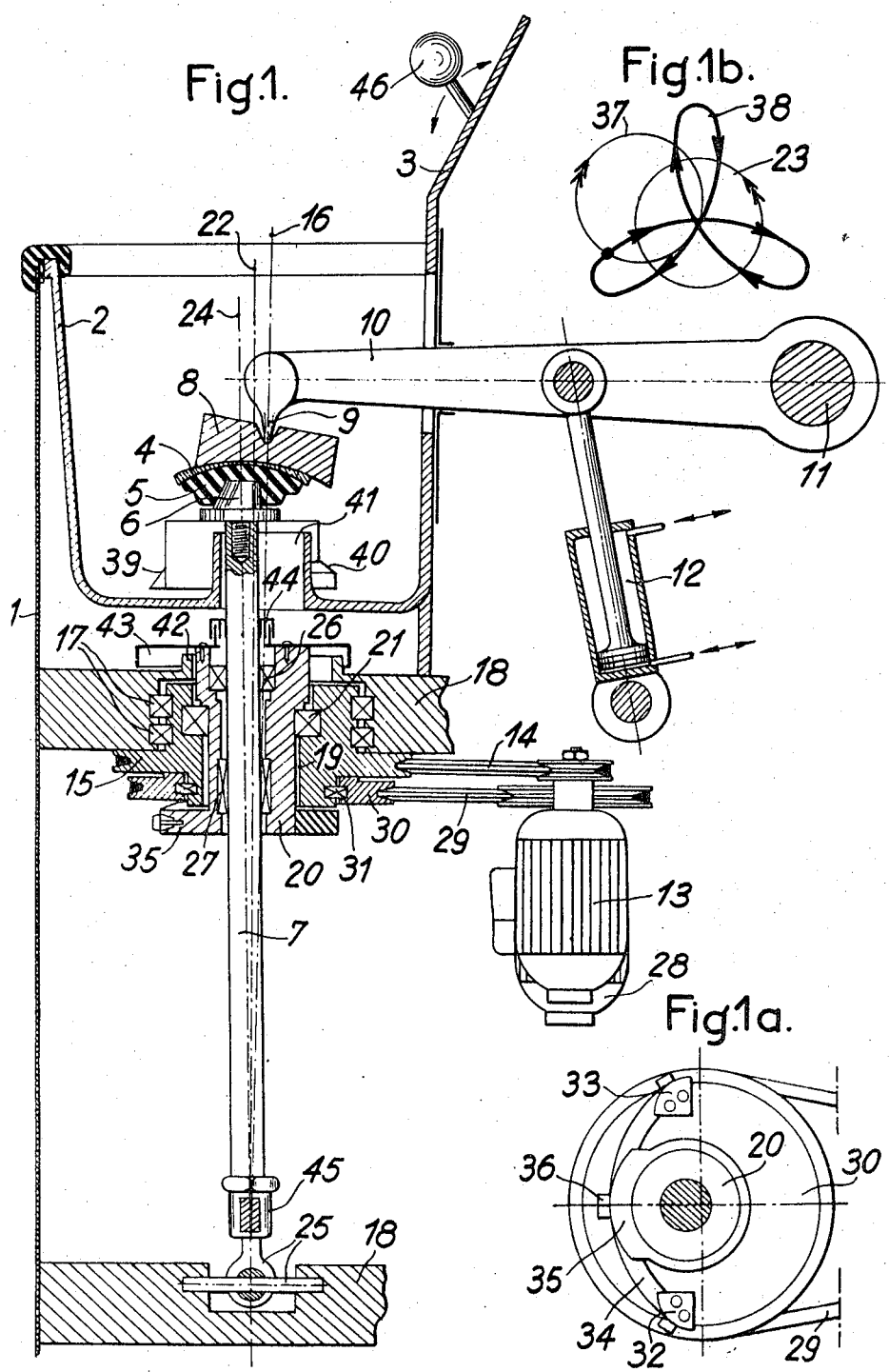

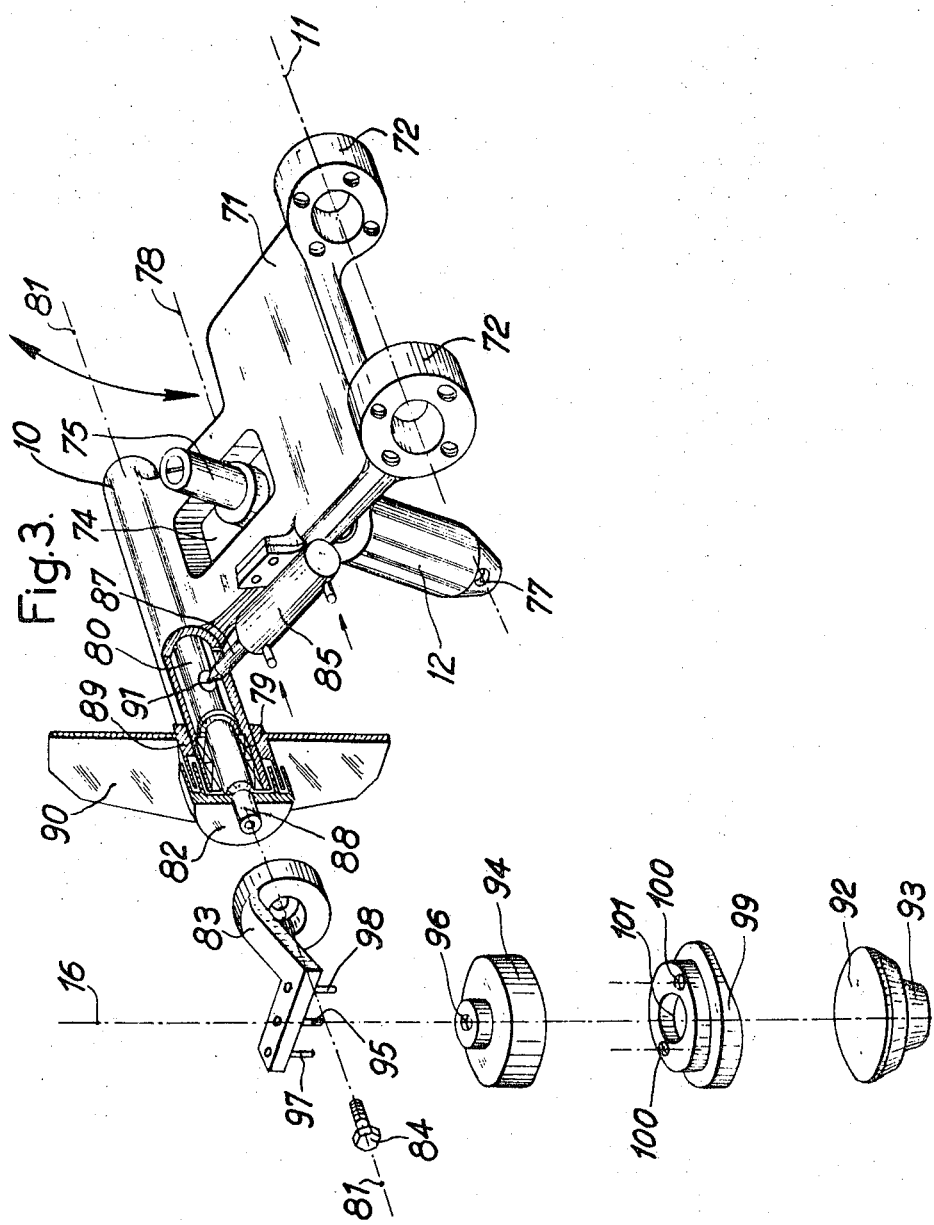

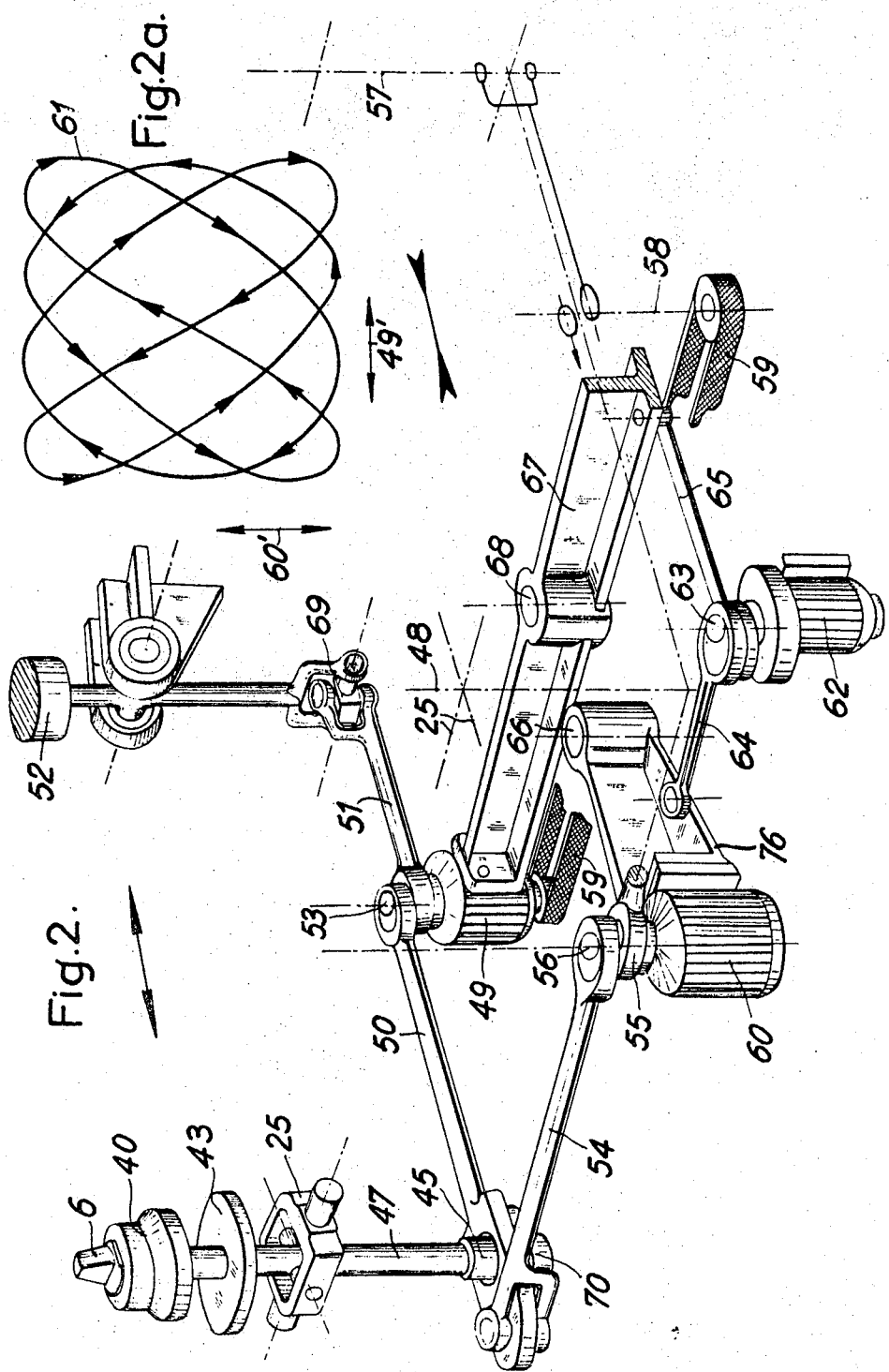

1

3,552,899
LENS SURFACING MACHINE
Luc Tagnon, Saint-Mande, France, assignor to Societe des Lunetiers, Temkine & Cie, Paris, France
Filed Mar. 19, 1968, Ser. No. 714,265
Claims priority, application France, Mar. 21, 1967, 99,640
Int. Cl. B24b 13/02
U.S. Cl. 51—160                                    4 Claims

ABSTRACT OF THE DISCLOSURE

Machine for grinding down and polishing ophthalmic lenses, in which the movements of the tool on the lens surface are obtained by means of spindles driven for translational motion by an arm exerting separately the tool pressure on the lens, characterized in that each spindle supported by a fixed universal joint receives the movements of two eccentrics driven from separate motors having parallel output shafts, either directly, in which case the spindle arm is driven by the first eccentric revolving in the other eccentric, or through the medium of perpendicular connecting-rods secured to the spindle arm by means of a universal joint, and that the tool control arm is actuated by an actuator mounted on damping devices and so pivoted that the tool designed for surfacing a toroidal surface has its equator constantly maintained in a fixed direction.

BACKGROUND OF THE INVENTION

The present invention relates in general to the manufacture of ophthalmic lenses and has specific reference to an improved machine for grinding down or polishing ophthalmic lenses.

In all cases, eyesight correction requires the availability of a great variety of ophthalmic lenses. In practice most requirements are concentrated on a few combinations adapted to be reproduced in series or manufactured according to mass-production processes. This is notably the case of spherical and sphero-cylindrical lenses of relatively moderate optical power. Outside this range, lenses are manufactured by the unit according to medical prescriptions from semi-finished glass disks having one face optically finished after having undergone the usual operations performed in mass-production processes. This first finished face may be for instance spherical or non-spherical, multi-focal or progressive, etc. To obtain the prescribed characteristics a spherical or toroidal surface is formed on the other face of a suitably selected semi-finished lens.

With the advent of modern optical lenses, notably progressive lenses, machining tolerances between the two faces of ophthalmic lenses have become increasingly strict, thus making conventional machines inadequate for the job. Thus, for example, when a tool is held in a stationary position by means of a fork subject to wear, it is extremely difficult to set with a sufficient degree of accuracy the tore formed on the second face with respect to the progression axis of a progressive semi-finished lens.

On the other hand, these prescription lenses are generally quite expensive and must be available within a very short time at a quality level at least as high as that of standard ophthalmic lenses. Therefore, rejection percentages must be kept at a very low rate which can only be obtained by a perfect control of the surfacing parameters, i.e. speed and pressure on the one hand, and the use of the latest techniques in the field, such as fine adhesive wiremesh and taffeta or the like, on the other hand.

2

The complexity and lack of flexibility of conventional machines make them ill-suited for obtaining this result.

SUMMARY OF THE INVENTION

In view of the foregoing, it is the essential object of the present invention to provide a machine for grinding down and polishing ophthalmic lenses by the unit with a high degree of precision and polish, in technologically extremely short time periods.

This object is achieved according to this invention by using two separate assemblies for producing respectively the pressure and the movement. In the machine of this invention a passive movable pivoted arm exerts an adjustable pressure on a tool carrying for example a polishing element engaging the lens surface to be polished. The ophthalmic lens is fastened to the head of a spindle driven with a composite circular and vibratory motion along a composite recurrent path, whereby any polishing element, even of periodic structure, can be used. Thus, an adhesive wire-mesh and an adhesive taffeta of same thickness may be used respectively for grinding down and polishing the same lens, these elements adhering to the tool of which the working surface acting as a simple support preserves its original geometric properties. A plurality of these spindles may be mounted in a common machine structure of relatively reduced overall dimensions, affording a high degree of cleanliness. A lens-surfacing workshop may be euipped with a series of identical machines of this type for performing only grinding-down and polishing operations.

BRIEF DESCRIPTION OF THE DRAWING

A first exemplary form of embodiment of a machine constructed according to the teachings of this invention will now be described in order to afford a clearer understanding of the invention, this description being followed by a disclosure of the invention in its present state of development. This description is given with reference to the attached drawings in which:

FIG. 1 illustrates in substantially axial vertical section a machine constructed according to the teachings of the present invention, the section being taken along the axis of the spindle of which the movement is the resultant of two rotational movements;

FIG. 1a is a fragmentary plan view from above of the spindle;

FIG. 1b shows the path followed by a point of the lens in relation to the polishing tool;

FIG. 2 shows an arrangement for driving two spindles in a same machine by combining two vibratory movements with a circular movement;

FIG. 2a illustrates the path followed by one point on the polishing tool on the lens surface;

FIG. 3 illustrates in perspective and in partially sectional and exploded view the tool mounting.

DESCRIPTION OF THE PREFERRED EMBODIMENT

Referring first to FIG. 1, it will be seen that it illustrates a simplified sectional view of a machine constructed according to this invention, the section being taken along a plane containing the primary axis of a spindle, as seen at right angles to the front of a bench or table on which the machine is mounted. This figure shows the housing 1 supporting the pan 2 and the control board 3. As already known in the art, by casting a low melting point metal into a mould of which the bottom consists of the lens 4 to be treated, this lens is rendered solid with a block 5 fitting on the taper 6 formed with a flat lateral face and screwed to the top of the spindle 7 of the machine. The casting machine affords an accurate positioning of the lens in relation to this flat face and therefore an accurate positioning on the spindle of the surfacing machine. To simplify the disclosure, it may be assumed that when it is contemplated to polish a spherical surface a tool 8 having a polishing material glued thereto is pressed against the lens 4 by the central point or nose 9 of the free end of an arm 10 pivoted on a shaft 11 disposed at right angles to the plane of the figure and responsive to a pneumatic cylinder and piston actuator 12. By adjusting the air pressure in this actuator the effort exerted by the arm on the tool is adjusted at will, the resulting pressure being independent of the minor oscillation of the tool.

An electric motor 13 has its output shaft connected through a V-belt 14 to a grooved pulley 15 adapted to revolve about a primary fixed axis 16 in a pair of ball-bearings 17 housed in the frame structure 18 of the machine. In an eccentric cavity 19 of pulley 15 a substantially tubular member 20 is driven for circular translation by means of a self-aligning or spherical-race bearing 21. The axis 22 of tubular member 20 intersects the axis 16 at a point coincident with the center of a universal joint 25 and in the plane of the tool 8 its path 23 is of circular configuration. This tubular member 20 further comprises an eccentric cavity of which the axis 24 intersects the axes 16 and 22 in the center of said universal joint 25. A roller bearing 26 and a needle bearing 27 are provided for coaxially mounting in this cavity the arm-forming spindle 7 having its root secured to the frame structure 18 by means of the universal joint 25. Another motor 28 drives through a V-belt 29 a grooved pulley 30 rotating about the axis 16 in a direction opposite to that of pulley 15, pulley 30 being mounted by means of a ball-bearing 31 on a journal portion of pulley 15. A resilient belt section 34 is secured at 32 and 33 to said pulley 30 and adapted to engage a pulley-like segment 35 of tubular member 20, a screw 36 being provided for fastening said pulley segment 35 to tubular member 20. The latter revolving about the axis 22 is driven by pulley 30 revolving in turn about axis 16 by means of this belt section 34 which absorbs the eccentric difference by its inherent resiliency. If the motor 13 alone were stopped, the path of axis 24 in the plane of the tool 8 would describe a circle 37 (FIG. 1b). By selecting the diameters of the driving pulleys in a manner to cause the circle 37 to be described twice as fast as circle 23, when the two motors 13 and 28 are energized a point of the lens 4 will describe the curve 38 on the polishing tool, or vice-versa. In fact, a ratio of about 1.83 is selected to produce a slow rotational change in this curve which facilitates the driving of the spherical tool. As this ratio number is not an integer, a point of said polishing tool will not describe a fixed path on the lens. Of course, during the grinding-down work for example a pump (not shown) is actuated to direct an emery-powder suspension in water against the glass surface, this suspension being recovered from the bottom of pan 2.

Since the slightest emery particle introduced into the spindle mounting would rapidly cause its destruction, an efficient protection system is provided.

Clamped between the taper 6 and spindle 7 is a cylindrical cap having either of the two external shapes 39 and 40 illustrated in FIG. 1 for projecting the emery suspension in water received thereby in lateral directions and towards the bottom of the pan 2, without producing any splash. The central collar 41 formed in the bottom of pan 2 protects the spindle mounting from a direct flow. Another safety stage is provided by flanged disk 43 secured to the top of the tubular member 20 and therefore revolving at a relatively high speed, so as to centrifugate any emery suspension having accidentally leaked from the pan 2. Baffle means 44 secured to the spindle 7 and held against rotation about its axis provides the necessary fluid tightness along the spindle. Besides, when the taper 6 formed with a flat lateral face is replaced by another similar member screwed in the top of spindle 7 provided to this end with a suitable tapped hole, the spindle 7 is simply rotated in its base 45 and locked therein by means of a screw and lock nut in order to align the aforesaid flat face with the reference axis.

This machine is entirely satisfactory for grinding down lenses. To this end a wire-mesh is glued by means of a suitable adhesive to the tool 8 so as to accommodate the shape thereof. This work is performed while wetting with emery suspension and takes about 4 minutes.

When the same machine is operated for polishing lenses the wire-mesh is substituted by a piece of taffeta carried by a suitable adhesive support of same thickness.

The same work (i.e. polishing) is performed while spraying with ceria. After about 8 minutes, when the polishing operation is completed, 4 zones of reduced surface area are left at the outer periphery of the lens by the taffeta pattern. When the polishing tool is replaced by a piece of pitched felt, for example, irregularities distributed all over the surface appear; these are sometimes referred to as "orange skin." To avoid these defects, attempts have been made with a view to obtain more complicated paths by either superposing a circular movement to the above-mentioned movements or providing a novel elementary path by combining vibratory movements superposing themselves to a circular movement as illustrated in FIG. 2.

This composite motion is obtained by using a pair of motors 49 and 60 carried by supports 67, 76 respectively which oscillate about fixed shafts 66, 68, respectively, connected through perpendicular connecting-rods 50, 54 respectively to the Universal joint 25 and the base of the spindle.

The spindle 47 (FIG. 2) is similar to the preceding one except that the eccentrics are eliminated therefrom. To illustrate another equivalent arrangement of this invention, the universal joint 25 is shown above the driving plane containing the base 45 of spindle 47. When the motor 49 is started the pair of connecting rods 50 and 51 mounted eccentrically and in relative opposition on the motor shaft 53 transmit two opposed vibratory movements to the spindle 47 and to the balance-weight 52 by means of a universal joint such as 69 or any other equivalent device. Under these conditions, a point of the tool can describe on the lens surface a sinusoidal movement along a rectilinear path. The aforesaid balance-weight 52 may be replaced by a spindle similar to spindle 47 without departing from the spirit and scope of the invention.

When only motor 60 is energized the same connecting-rod system 54 and 55 mounted on an eccentric 56 drives in opposite directions the spindle 47 and a similar spindle of which only the axis is shown at 48. The aforesaid point on the polishing tool will thus describe a sinusoidal movement on the lens, along a rectilinear path but at right angles to the preceding one.

Like the spindle 47, its companion spindle 48 is associated with a balance-weight 57 through a similar connecting-rod and eccentric system driven from a motor 58 of which only the axis is shown to simplify the drawing.

In order to cause the vibratory movements transmitted to the frame structure of the machine to cancel each other both in force and torque, the motors 49 and 58 are coupled with each other by means of a notched belt 59, so as to synchronize the movements of the two spindle and balance-weight assemblies in their planes while maintaining them in position.

When all the motors revolve simultaneously, the above-mentioned point of the polishing tool describes on the glass surface carried, say, by spindle 47, a path pertaining to the well-known type of the Lissajous curves. In practice, rotational velocities of the order of 1,000 r.p.m. for motor 60 and 750 r.p.m. for motor 49 and for the motor whose axis is shown at 58 are used. The same tool point will thus describe on the glass surface a path 61 if an initial phase displacement is provided. The arrows 49' and 60' show in the vicinity of this curve the direction of movement of the corresponding motors.

To this periodic pattern a circular movement of the spindle is superposed; this circular movement is obtained as follows: A motor and reduction gearing unit 62 drives an eccentric trunnion 63 of which the circular path is decomposed into a rectangular movement by connecting rods 64 and 65. The connecting-rod 64 transmits one of the components to the rigid frame-structure or mounting of motor 60 mounted on a pivot pin 66. The other connecting-rod 65 transmits the other component to the common frame structure or mounting 67 or motors 49 and 58 which is pivoted about a pin 68. Connecting-rods 50 and 54 transmit the movements of motors 49 and 60 to the bottom end of spindle 47 and reconstitute a circular path, this result being obtained by using simple and known geometrical means.

If the motor and reduction-gearing unit 62 is operated at a velocity corresponding to a prime number of the above-mentioned speed figures "1,000 r.p.m." and "750 r.p.m," for example 16 r.p.m., a given point of the polishing tool will never pass twice on the same path.

Under these conditions it is obvious that with this machine very satisfactory results are obtained with the grinding down operation. Irrespective of the type of polishing surface utilized (taffeta, felt, pitched felt, etc.) a high-quality polish is obtained within about 8 minutes.

Technological times show that in a workshop it will be necessary to associate (as a rule) one spindle for grinding down with two polishing spindles. A range of machines is affected to grinding down or polishing work only when filling the tanks of the sprinkling pumps with an emery suspension or ceria.

Besides, the mechanical arrangements of these machines affords a considerably increment in the velocity of rotation of the motors without any other problem than the balance question which is perfectly solved at the velocities mentioned hereinabove.

The arm shown diagrammatically at 10 in FIG. 1 is actually constructed as shown in FIG. 3. A body 71 preferably of light alloy is pivotally mounted by means of bearings (not shown) about an axis 11 extending at right angles to the primary spindle axis 16. A hole 74 formed in the middle of this body 71 is adapted to receive the damping head 75 of the actuator 12 adapted to pivot about an axis 78 parallel to axis 11. At the opposite end of said body 71 a bore having its axis 81 parallel to 11 has mounted therein a shaft 80 by means of ball and needle bearings 79 acting as thrust bearings. One end of this shaft 80 emerges at 88 and carries a cap 82 provided with baffle means to prevent the ingress of emery or like abrasive suspension into the bearings. The projecting end 88 of shaft 80 further carries a pin holder 83 secured by a screw 84 and adapted to revolve bodily with shaft 80. The baffle cap 82 is fitted on a member 89 completing it and secured to said body 71; this member 89 carries a shield 90 adapted to close the aperture formed in the housing for permitting the passage of the arm end. A small auxiliary pneumatic actuator 85 is provided for urging the tapered point 87 into the lateral notch or cavity 91 of shaft 80 and lock same against rotation. Considering the surfacing of a spherical lens and then of a toroidal lens, the arm assembly operates as follows:

In the inoperative position the actuator 12 reacting against the frame structure by means of its strap 77 keeps the arm in its raised position. Assuming firstly the surfacing of a spherical lens 92 pressed on the spindle by means of a block 93, the operator will position and maintain the tool 94 on the point 95 of which the end, positioned on the axis 81, engages the central aperture 96 of the tool. The operator subsequently moves the actuator control lever to its LOW position. Thus, this actuator will lower the arm and press the tool against the lens while compressing the spring housed in the damping head 75 to half its permissible stroke. During the spindle operation the minor tool oscillations are absorbed by this spring, thus avoiding a premature wear of the actuator seals. As the point 95 wears off, a torque develops which is more accentuated in the shortest surfacing radii and tends to rock the point-holder and release the tool. This inconvenience is avoided by locking the shaft by means of the actuator 85. At the end of the operation a time-switch stops the machine and the operator controls the upward movement of the arm by means of actuator 76.

Assuming now that a toroidal surface has to be polished by using a tool 99, the operator will release the shaft 80 and the points 97 and 98 can revolve freely in a plane strictly perpendicular to the axis 81 of shaft 80. During the downward movement of the arm these points engage a pair of corresponding recesses 100 and the central point 95 remains free in the large aperture 101. These lateral recesses 100 are located strictly in one of the two main planes of symmetry of the working surface of member 99. As a rule, the main plane will be that containing the longest radius of the equator. Whatever the positions of the arm and tool, this main plane of symmetry contains the straight line represented by the points 97 and 98, which remains a plane fixed in the space, perpendicular to 81 and therefore to 11.

Since on the other hand it is known to orient the lens with precision on the translationally driven spindle, these main elements will have at each point of the polished surface the desired optical power and orientation characteristics, with the maximum precision.

The machine according to this invention is characterized by many advantageous features which will readily appear from the foregoing.

Thus, the pressure and velocity functions, constituting the fundamental parameters in surfacing operations, are obtained separately without any incidence of one parameter on the other.

More particularly, the pressure, easily adjustable with a machine according to this invention, permits of obtaining working conditions approximating the ideal ones for all the materials usually employed in ophthalmic techniques, such as glass, quartz, plastics, etc.

Speed is limited only by the obtaining of adequate balancing effects.

No difference is observed between the polishing of a spherical surface and that of a toroidal surface.

The lens is maintained throughout its surface so that relatively high pressure values can be used without any risk of breaking the workpiece.

The lens positioning depends only on the machine for casting the intermediate support which can now be constructed with a high degree of precision.

The main axes of a toroidal lens are strictly oriented according to the selected reference lines, independently of the tool thickness, of the point wear, etc.

Finally, surfacing times are extremely reduced.

A polishing or surfacing workshop equipped with machines according to this invention constitutes a particularly flexible assembly. Each machine is operable indifferently for grinding down or polishing. The change from one to the other mode of operation is obtained by simply replacing the surfacing fluid by another, for example emery by ceria in the case of glass. This change is preceded by a thorough cleaning of the assembly and facilitated by using a sprinkling unit separate from the machine and adapted to be easily replaced and connected.

Finally, any projection outside the pan 2 is safely prevented and therefore the workshop remains constantly very clean, so that working conditions approximate those of a laboratory.

What we claim is:

1. A machine for honing and polishing ophthalmic lenses which comprises a frame structure, a vessel formed with an orifice through its bottom, a vertical spindle extending through this orifice, a Universal joint at the lower end of said spindle, a frustoconical element formed with a flat lateral face and screwed to the upper end of said spindle, a rigid block fitted to said frustoconical element for supporting a lens in a stationary relation with the block, a work tool, an arm for pressing said tool against the lens, a pneumatic cylinder and piston actuator controlling the upward movement of said arm, a pair of supports adapted to oscillate about a pair of fixed axes of said frame structure, two motors mounted on said supports, a pair of eccentrics mounted on the output shafts of said motors respectively, a pair of connecting rods extending at right angles to each other in their mean position for transmitting the movements of said eccentrics to said spindle through said Universal joint, a fixed motor and reduction-gearing unit, an eccentric trunnion driven from said last-named motor, a pair of connecting rods extending at right angles to each other in their mean position for transmitting in superposed relationship to the preceding movements the two rectangular components of the circular movement of said trunnion to said oscillating supports of motors and through said first-named connecting rods to said spindle.

2. A machine for honing and polishing ophthalmic lenses which comprises a frame structure, a vessel formed with an orifice through its bottom, a vertical spindle extending through said orifice, a Universal joint at the lower end of said spindle, a frustoconical element formed with a flat lateral face and screwed to the upper end of said spindle, a rigid block fitted to said frustoconical element for supporting a lens in a stationary relation with the block, a work tool, an arm for pressing said tool against the lens, a pneumatic cylinder and piston actuator controlling the upward movement of said arm, a first motor mounted in a fixed position to said frame structure, a ring rotatably driven from said first motor in said frame structure about a vertical axis, a sleeve trunnioned eccentrically in said ring, a second motor mounted in a fixed position to said frame structure, a pulley driven from said second motor and mounted coaxially to said ring, a sleeve comprising an eccentric bore receiving therethrough said spindle driven for conical translation through ball-bearings, and a resilient member connecting said pulley to said sleeve for driving the spindle.

3. A machine as set forth in claim 1, wherein the arm pressing the work tool against the surface of the lens comprises a body revolving about an axis perpendicular to the axis of said ring, a central aperture receiving the damping head of the arm-controlling cylinder and piston unit, a shaft sleeve secured to the edge of said body, parallel to the axis of rotation thereof, a shaft trunnioned in said sleeve, an auxiliary cylinder and piston unit for locking said shaft, and a point carrier mounted to the end of said shaft and adapted to receve the work tools.

4. A machine as set forth in claim 2, wherein the arm pressing the work tool against the surface of the lens comprises a body revolving about an axis perpendicular to the axis of said ring, a central aperture receiving the damping head of the arm-controlling cylinder and piston unit, a shaft sleeve secured to the edge of said body, parallel to the axis of rotation thereof, a shaft trunnioned in said sleeve, an auxiliary cylinder and piston unit for locking said shaft, and a point carrier mounted to the end of said shaft and adapted to receive the work tools.

References Cited
UNITED STATES PATENTS

| | | | |
|---|---|---|---|
| 3,172,241 | 3/1965 | Habenicht | 51—120 |
| 3,383,806 | 5/1968 | Stratemeyer | 51—119 |

OTHELL M. SIMPSON, Primary Examiner